United States Patent
Tsubata

(10) Patent No.: US 7,805,277 B2
(45) Date of Patent: Sep. 28, 2010

(54) STEP NUMBER MEASURING APPARATUS

(75) Inventor: Keisuke Tsubata, Chiba (JP)

(73) Assignee: Seiko Instruments Inc. (JP)

( * ) Notice: Subject to any disclaimer, the term of this patent is extended or adjusted under 35 U.S.C. 154(b) by 722 days.

(21) Appl. No.: 11/703,013

(22) Filed: Feb. 6, 2007

(65) Prior Publication Data
US 2007/0202997 A1 Aug. 30, 2007

(30) Foreign Application Priority Data
Feb. 16, 2006 (JP) ............... 2006-039476

(51) Int. Cl.
*A63B 22/02* (2006.01)
(52) U.S. Cl. .............. 702/160; 702/127; 702/155; 702/158; 377/24.2; 482/54; 482/90; 482/901; 482/902
(58) Field of Classification Search ........... 702/155, 702/158, 160, 190, 127; 377/24.2; 482/54, 482/900–902
See application file for complete search history.

(56) References Cited

U.S. PATENT DOCUMENTS

| | | | |
|---|---|---|---|
| 5,475,725 A * | 12/1995 | Nakamura | 377/24.2 |
| 6,254,513 B1 | 7/2001 | Takenaka et al. | |
| 7,512,515 B2 * | 3/2009 | Vock et al. | 702/141 |
| 2003/0208335 A1 * | 11/2003 | Unuma et al. | 702/141 |
| 2004/0186695 A1 | 9/2004 | Aoshima et al. | |
| 2005/0240375 A1 | 10/2005 | Sugai | |

FOREIGN PATENT DOCUMENTS

| | | |
|---|---|---|
| EP | 1199544 | 4/2002 |
| EP | 1366712 | 12/2003 |
| JP | 09/223214 | 8/1997 |
| JP | 2003/159359 | 6/2003 |

* cited by examiner

*Primary Examiner*—Sujoy K Kundu
(74) *Attorney, Agent, or Firm*—Adams & Wilks

(57) ABSTRACT

To provide a step number measuring apparatus in which a reduction in electric power is intended by a simple constitution, and which can correspond to plural movements. A CPU calculates a moving motion pitch on the basis of a detection signal from sensors that a switching circuit has selected, calculates the moving motion pitch by performing a processing having been selected from among plural kinds of processings, which have been stored in a memory, on the basis of the detection signal from the sensors that the switching circuit has selected, calculates the moving motion pitch by selecting the other processing among the plural kinds of processings when both the moving motion pitches differ, and performs a step number measurement by the selected processing when both the moving motion pitches become the same.

5 Claims, 4 Drawing Sheets

FIG. 4
| | WALKING | EW | RUNNING |
|---|---|---|---|
| ANGLE OF ARM | ARM IS HUNG | | ELBOW IS BENT |
| PITCH | SLOW | | RAPID |
| SIGNAL INTENSITY | WEAK | | STRONG |
| SENSOR | FOR WALKING | | FOR RUNNING |
| ALGORITHM | FOR WALKING | | FOR RUNNING |
FIG. 5
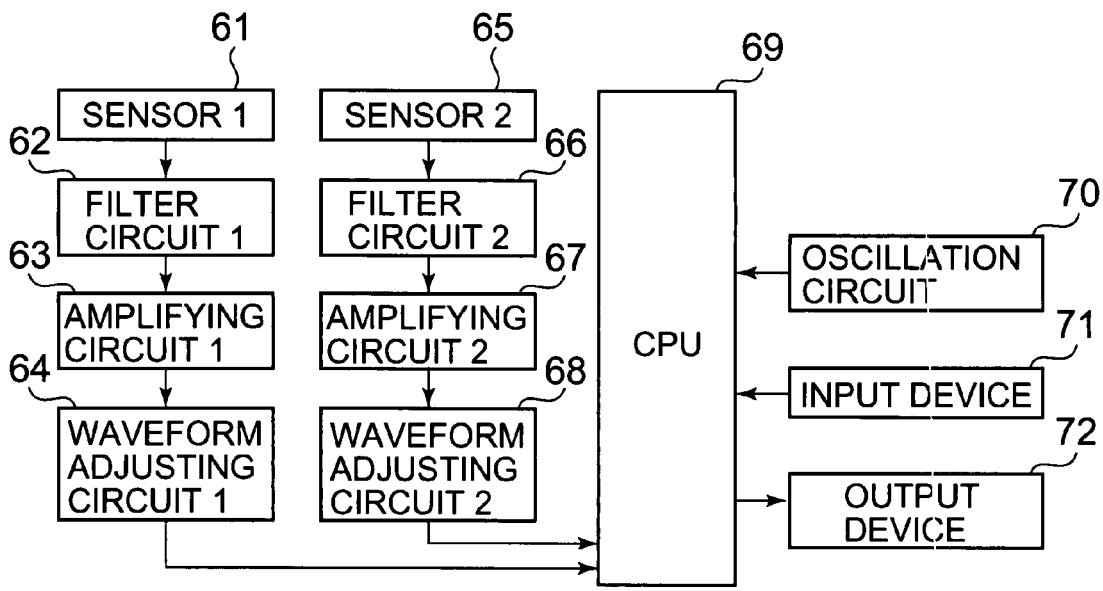
FIG. 6
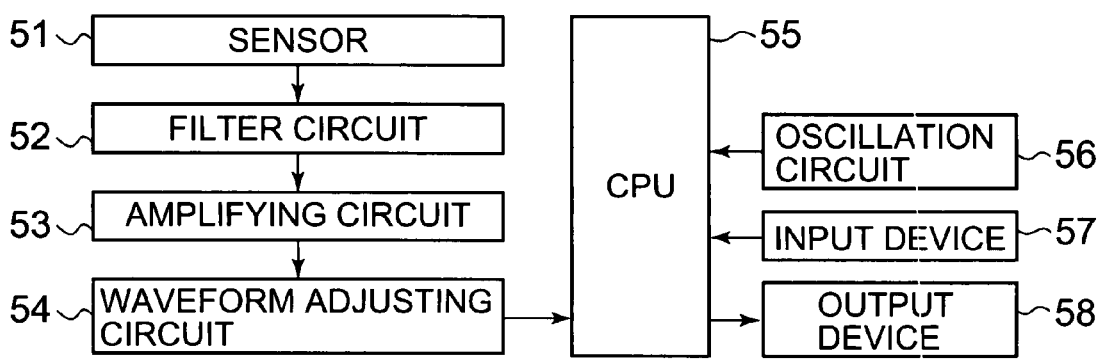

STEP NUMBER MEASURING APPARATUS

BACKGROUND OF THE INVENTION

1. Field of the Invention:

The present invention relates to a step number measuring apparatus which measures the number of steps taken by a person.

2. Description of the Prior Art:

From olden times, the step number measuring apparatus is used in order to measure the number of steps.

An angle of an elbow of a person differs at a walking time, an excise (brisk) walking (moving motion of walking at a speed of the same degree as a walking while swinging the elbow similarly to the running time) time and a running time and, in a case where it has been attempted to detect a landing impact as the moving motion by a sensor, it is difficult to detect all of the walking, the excise walking and the running by one sensor because an optimum sensitivity axis of the sensor differs.

In order to solve this problem, there is publicly known a technique having been made so as to correspond to all movements by using plural sensors whose sensitivity axes differ (for example, refer to JP-A-9-223214 Gazette and JP-A-2003-159359 Gazette).

FIG. 5 is a block diagram of a pedometer having been described in the JP-A-9-223214 Gazette. The pedometer detects a walking signal by using detecting sections of two systems (sensors 61, 65 whose sensitivity axes differ, filter circuits 62, 66, amplifying circuits 63, 67, and waveform adjusting circuits 64, 68), and a CPU 69 operating on the basis of a clock signal of an oscillation circuit 70 calculates the number of steps and outputs it to an output device 72 such as display. Incidentally, 71 is an input device.

By this, although it is possible to correspond to the movement such as walking and running, a constitution becomes complicated, so that there is a problem that a miniaturization and a saving of electric power are difficult.

As a method of solving this problem, in an electronic pedometer having been described in the JP-A-2005-309693 Gazette, by providing a restriction, in the movement to be detected, the miniaturization and a reduction in electric power consumption are intended by one sensor.

FIG. 6 is a block diagram of the electronic pedometer having been described in the JP-A-2005-309693 Gazette. The electronic pedometer detects the walking, signal by using one sensor 51, a filter circuit 52, an amplifying circuit 53, and a waveform adjusting circuit 54, and a CPU 55 operating on the basis of a clock signal of an oscillation circuit 56 calculates the number of steps and outputs it to an output device 58 such as display. Incidentally, 57 is an input device.

By this, since the step number detection becomes possible by using one sensor, the miniaturization and the saving of electric power become possible, but there is a problem that there exists a restriction in a detecting movement.

A problem of the invention is to provide a step number measuring apparatus in which a reduction in electric power is intended by a simple constitution, and which can correspond to plural movements.

SUMMARY OF THE INVENTION

According to the invention, there is provided a step number measuring apparatus characterized by possessing plural sensors which detect a moving motion to thereby output a corresponding detection signal and whose sensitivity axes mutually differ, a sensor selecting means selecting any of the sensors, a 1st calculation means calculating a moving motion pitch on the basis of the detection signal from the sensor that the sensor selecting means has selected, a 2nd calculation means calculating a moving motion pitch by performing a processing that a control means has selected from among plural kinds of processings on the basis of the detection signal from the sensor that the sensor selecting means has selected, the control means which selects any processing from among the plural kinds of processings, and selects the other processing among the plural kinds of processings when the moving motion pitches that the 1st calculation means and the 2nd calculation means have calculated differ, and a step number measuring means performing a step number measurement by the processing that the control means has selected.

The 1st calculation means calculates the moving motion pitch on the basis of the detection signal from the sensor that the sensor selecting means has selected. The 2nd calculation means calculates the moving motion pitch by performing the processing that the control means has selected from among plural kinds of processings on the basis of the detection signal from the sensor that the sensor selecting means has selected. The control means selects any processing from among the plural kinds of processings, and selects the other processing among the plural kinds of processings when the moving motion pitches that the 1st calculation means and the 2nd calculation means have calculated differ. The step number measuring means performs the step number measurement by the processing that the control means has selected.

Here, in a case where a predetermined detection signal is not outputted from the sensor that the sensor selecting means has selected, the control means controls the sensor selecting means so as to select the other sensor.

Further, there may be constituted such that it has an amplifying means amplifying and outputting the detection signal from the sensor that the sensor selecting means has selected, the control means alters a gain of the amplifying means to a gain complying with the selected processing, and the 1st calculation means and the 2nd calculation means calculate the moving motion pitches on the basis of the detection signal outputted from the amplifying means and the step number measuring means performs the step number measurement.

Further, there may be constituted such that a sensor for walking, which has a sensitivity axis suitable for a walking detection, and a sensor for running, which has a sensitivity axis suitable for a running detection, are included in the plural sensors, and a processing for walking and a processing for running are included in the plural processings, the control means selects the sensor for walking and the processing for walking when performing the step number measurement at a walking time, selects the sensor for running and the processing for walking when performing the step number measurement at an excise walking time, and selects the sensor for running and the processing for running when performing the step number measurement at a running time, and the step number measuring means performs the step number measurement by using the sensor and the processing, that the control means has selected.

Further, there may be constituted such that in a case where the control means has judged that, under a state in which the processing is set to the processing for running, the moving motion pitch that the 2nd calculation means has calculated is not a pitch corresponding to the running, it switches the processing to the processing for walking.

Further, there may be constituted such that in a case where the control means has judged that, under a state in which the processing is set to the processing for walking, the moving motion pitches that the 1st calculation means and the 2nd calculation have calculated mutually differ, it switches the processing to the processing for running.

BRIEF DESCRIPTION OF THE SEVERAL VIEWS OF THE DRAWINGS

A preferred form of the present invention is illustrated in the accompanying drawings in which:

FIG. 4 is an explanatory diagram for explaining operations of the present embodiment;

FIG. 5 is a block diagram of a conventional step number measuring apparatus; and FIG. 6 is a block diagram of a conventional step number measuring apparatus.

DETAILED DESCRIPTION OF THE PREFERRED EMBODIMENTS

Figure 1:
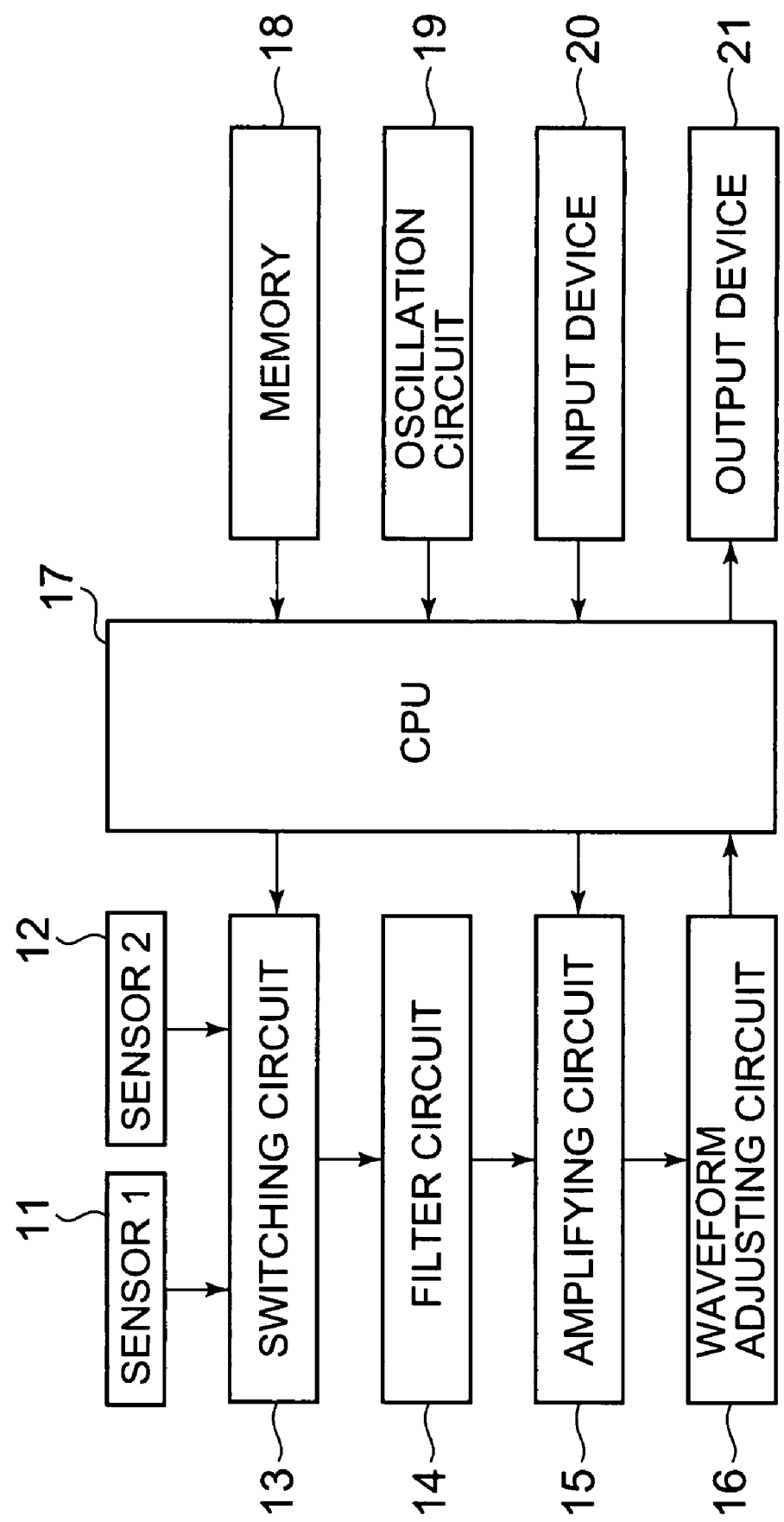
FIG. 1 is a block diagram of a step number measuring apparatus illustrating one embodiment of the invention.

FIG. 1 is a block diagram of a step number measuring apparatus according to one embodiment of the invention.

In FIG. 1, the step number measuring apparatus has a sensor (1st sensor) 11 for walking, which has in sensitivity axis suitable for a walking detection, and detects a moving motion (the walking, the excise (brisk) walking and the running in the present embodiment) of a person to be measured to thereby output a corresponding detection signal, and a sensor (2nd sensor) 12 for running, whose sensitivity axis differs from the sensor 11, which has the sensitivity axis suitable for a running detection, and detects the moving motion of the person to be measured to thereby output a corresponding detection signal. A switching circuit 13 selects one of the sensor 11 and the sensor 12 to thereby output the detection signal that is an output signal of the selected sensor, a filter circuit 14 removes noise from the detection signal from the sensor 11 or the sensor 12, which has been outputted through the switching circuit 13, an amplifying circuit 15 amplifies and outputs the detection signal from the filter circuit, and a waveform adjusting circuit 16 waveform-adjusts the amplified detection signal from the amplifying circuit 15 to thereby output the detection signal in the form of a rectangular wave. A central processing unit (CPU) 17 performs a moving motion pitch calculation based on the detection signal from the wave form adjusting circuit 16, a step number calculation, a control of the switching circuit 13, a gain control of the amplifying circuit 15, and the like, a memory 18 stores a program that the CPU 17 implements along with data of a pitch, a step number and the like, and an oscillation circuit 19 generates a clock signal for the CPU 17 and a timepiece signal suitable for use as a reference of a clocking operation. An input device 20 performs an input operation of a display switching or the like, and an output device 21 which is constituted by a liquid crystal display or the like displays the step number, a time or the like.

Here, the switching circuit 13 constitutes a sensor selecting means, the amplifying circuit 15 constitutes an amplifying means, the CPU 17 constitutes a 1st calculation means, a 2nd calculation means, a control means and a step number measuring means, and the memory 18 constitutes a storage means.

Incidentally, a level of the detection signal obtained at a running time is higher than the detection signal obtained at a walking time. In order to homogenize the level of the detection signal inputted to the CPU 17 irrespective of a kind of the moving motion, the CPU 17 controls the amplifying circuit 15 so as to set a gain of the amplifier 15 to a predetermined high gain in a case where the moving motion pitch calculation and a step number measurement are performed by using a later-mentioned algorithm (processing) for walking, and set it to a low gain lower than the above gain by a predetermined gain in a case where the moving motion pitch calculation and the step number measurement are performed by using an algorithm for running.

Figure 2:
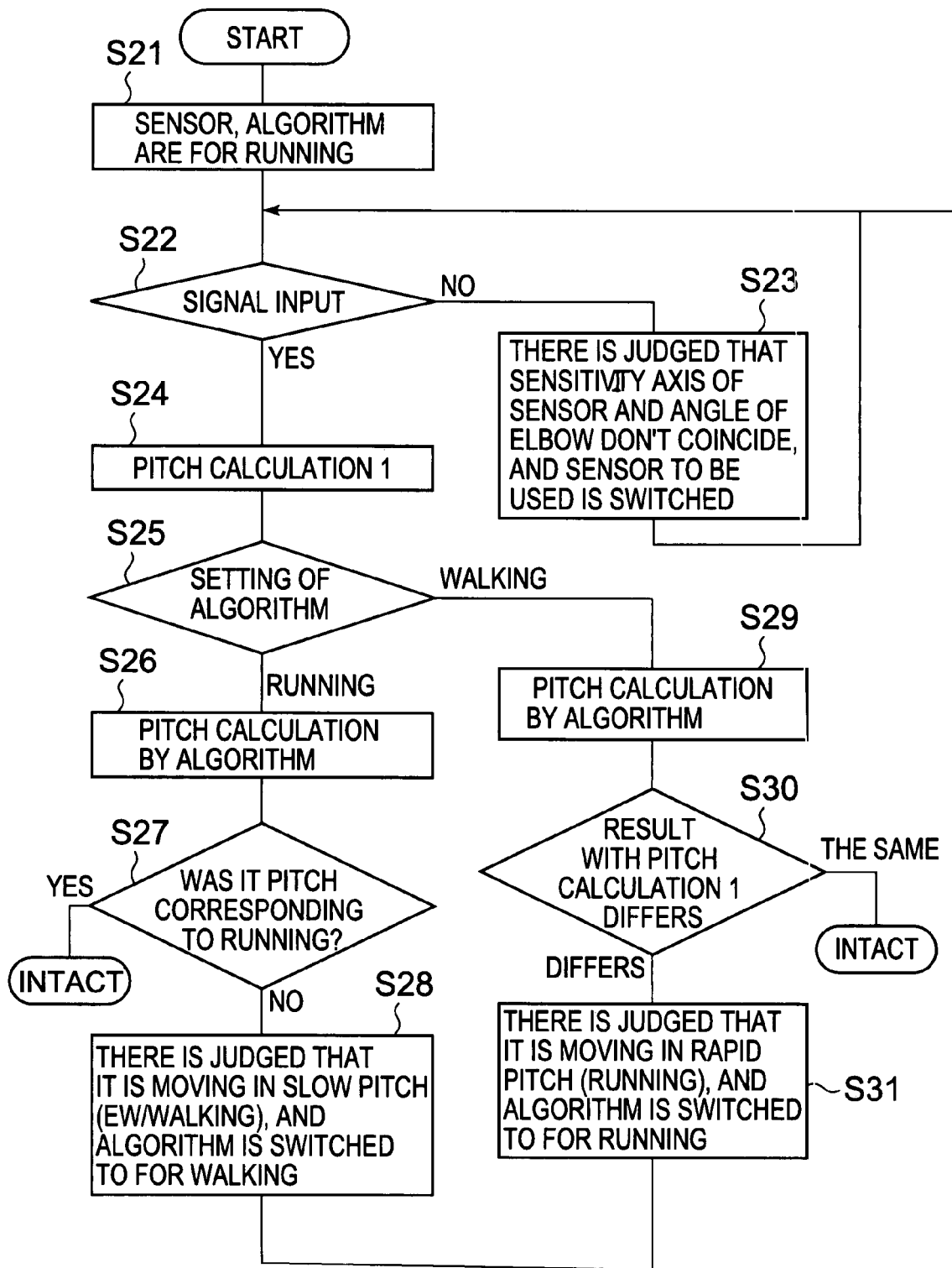
FIG. 2 is a flowchart showing processings in the embodiment of the invention.

FIG. 2 is a flowchart showing a processing in the step number measuring apparatus in accordance with this embodiment of the invention.

Figure 3:
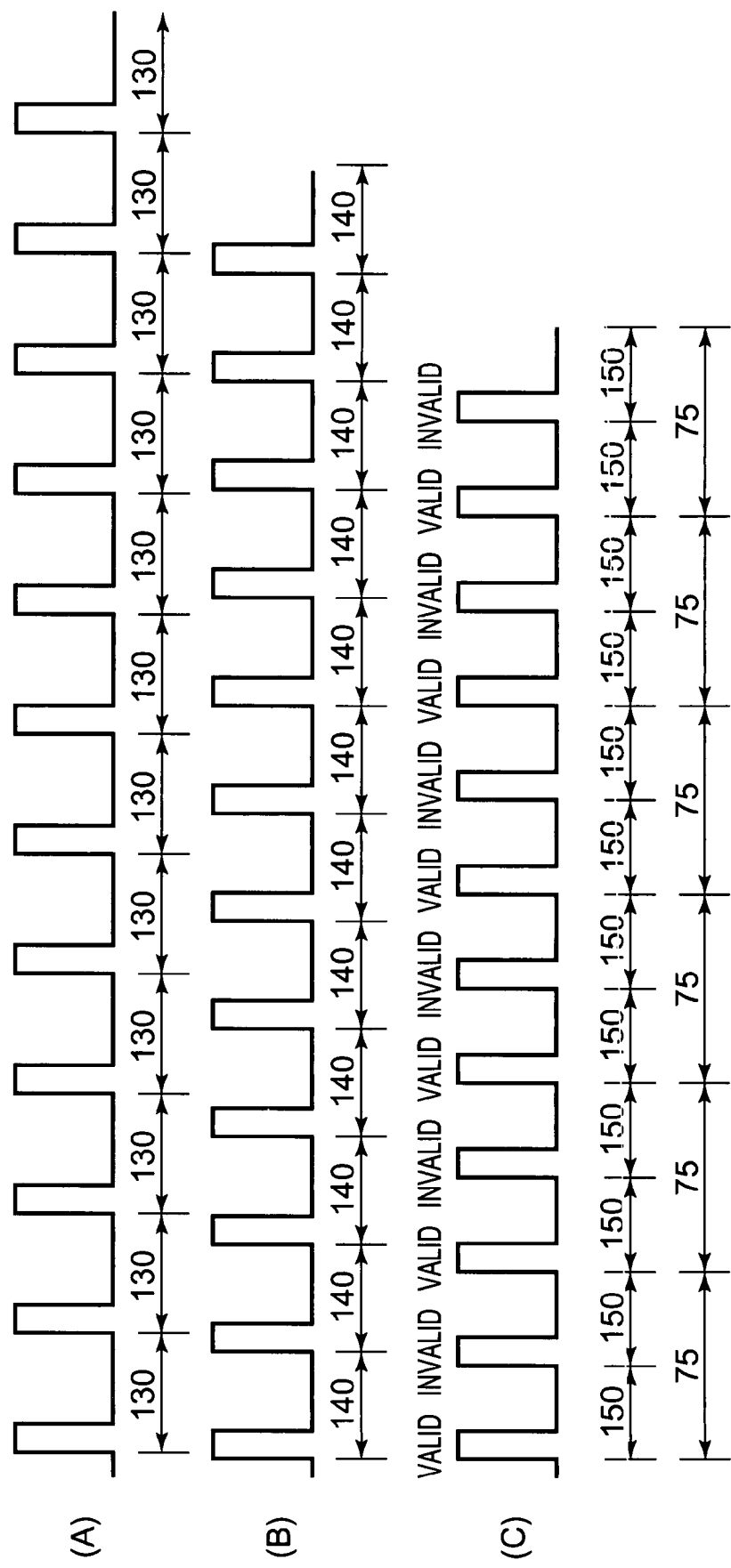
FIGS. 3 are timing diagrams showing processings in the embodiment of the invention.

FIGS. 3 are timing diagrams showing the processing in the step number measuring apparatus concerned with the embodiment of the invention.

Further, FIG. 4 is an explanatory diagram for explaining an operation in the step number measuring apparatus concerned with the embodiment of the invention. As shown in FIG. 4, as the moving motion of the person to be measured, there are assumed three kinds of the walking, the excise walking (moving motion of walking at the speed of the same degree as the walking while swinging the elbow similarly to the running time) and the running.

At the walking time, the arm is in a hanging state, a walking pitch that is a moving motion pitch is slow, and a signal intensity obtained from the sensor is weak. At the excise (brisk) walking (EW) time, the arm is in a state where the elbow is bent, the moving motion pitch is slow similarly to the walking, and the signal intensity obtained from the sensor is weak. Further, at the running time, the arm is in the state where the elbow is bent, a running pitch that is the moving motion pitch is more rapid than the walking pitch, and the signal intensity obtained from the sensor is stronger than the walking and the like.

Although the details are mentioned later, in the present embodiment, at the walking time, the sensor 11 for walking is used, and the algorithm (processing) for measuring the number of steps and the like uses the algorithm for walking. At the excise walking time, the sensor 12 for running is used, and the algorithm for measuring the number of steps and the like uses the algorithm for walking. Further, at the running time, there is adapted such that the sensor 12 for running is used, and the algorithm for measuring the number of steps and the like uses the algorithm for running. Incidentally, the plural algorithms are stored in the memory 18 and, by the fact that the CPU 17 is implemented, a pitch measurement of the moving motion and the step number measurement are performed. Further, in the present embodiment, it is deemed that a measurement in a range in which the pitch is 80-150 is possible by the algorithm for walking and, further, a measurement in a range in which the pitch is 150-220 is possible by the algorithm for running.

Hereunder, an operation of the present embodiment is explained by using FIGS. 1-4.

First, the CPU 17 controls the switching circuit 13 so as to select the sensor 12 for running as the sensor for moving motion detection, and selects the algorithm for running, which has been stored in the memory 18. Further, the CPU 17 sets the gain of the amplifying circuit 15 to the low gain while coinciding with the above algorithm (step S21).

Under this state, the CPU 17 judges whether or not the detection signal of the moving motion has been inputted through the sensor 12 for running, the switching circuit 13, the filter circuit 14, the amplifying circuit 15 and the waveform adjusting circuit 16 (step 522) and, when the detection signal is not inputted, it judges that the sensitivity axis of the sensor does not coincide with the angle of the elbow, thereby controlling the switching circuit 13 so as to select the sensor 11 for walking, that is the other sensor, as the sensor to be used and returning to the processing step 522 (step 523).

In a case where, in the step S22, the CPU 17 has judged that the above detection signal has been inputted, it calculates the pitch on the basis of the above detection signal after a signal outside a predetermined range (e.g., 80-220) considered that the pitch is in a range of the moving motion has been removed in a filtering processing (step S24). The step S24 constitutes the 1st calculation means.

Next, in a case where the CPU 17 has judged that the algorithm is set to the algorithm for running (step S25), it calculates the pitch of the moving motion by the algorithm for running on the basis of the detection signal after having been filtered by the processing step S24 (step S26), and judges whether or not it is a pitch (e.g., 150-220) corresponding to the running (step S27). The step S26 constitutes a 2nd calculation means. In a case where the CPU 17 has judged that it is the pitch corresponding to the running, it judges that the algorithm concerned is suitable, thereby performing a step number calculation on the basis of the above detection signal by the algorithm. An information of the step number having been calculated is outputted to the output device 21, thereby performing a display and the like.

In a case where, in the step S27, the CPU 17 has judged that it is not the pitch corresponding to the running, it judges that the moving motion is performed by a slow pitch (the walking or the excise walking), thereby switching the algorithm to the algorithm for walking and returning to the step S22 (step S28).

On the other hand, in a case where, in the step S25, the CPU 17 has judged that it is set to the algorithm for walking, it calculates the pitch of the moving motion by the algorithm for walking on the basis of the detection signal after having been filtered by the processing step S24 (step S29), and judges whether or not it is the same as the pitch having been calculated in the step S24 (step S30). The step S29 constitutes the 2nd calculation means.

FIGS. 3 show examples in a case where, in the step S30, the CPU 17 judges that the pitch is the same and a case where it judges that it differs, and is an example in which a pitch becoming a boundary between the walking and the running has been set to 145. Incidentally, each pulse signal is the detection signal inputted to the CPU 17 from the waveform adjusting circuit 16.

In a pitch calculation processing in the step S24, in a case where signals of FIGS. 3A-C have been inputted to the CPU 17 from the waveform adjusting circuit 16, since the moving motion pitch is simply calculated from a cycle of each detection signal, as the pitch there are obtained respectively 130, 140 and 150. On the other hand, in the step S29, in a case where the algorithm is the algorithm for walking, in a case if the boundary between the walking and the running has been set to the pitch 145, since the pitches 130, 140 are obtained respectively in. FIGS. 3A and 3B, there becomes the same as the pitch having been calculated in the step S24.

However, in a case of the same drawing FIG. 3C, since the pitch is 150, the measurement is impossible and, since the detection signal is detected (made valid) every other one and thus miscalculated as pitch 75 of a half, there becomes a value different from the pitch having been calculated in the step S24. Like this, it follows that, if a suitable algorithm is selected, the same pitch is obtained but, in the case where an unsuitable algorithm is selected, the different pitch is obtained.

In a case where the CPU 17 has judged in the step S30 that the pitch is the same, it judges that the algorithm concerned is suitable and, by the algorithm, performs a step number calculation on the basis of the above detection signal. An information of the step number having been calculated is outputted to the output device 21, thereby performing a display and the like.

In a case where the CPU 17 has judged in the step S30 that the pitch differs, it judges that the moving motion is performed in the pitch (running) rapider than the walking, and switches the algorithm to the algorithm for running, thereby returning to the step S22 (step S31) and repeating the above processings. The steps S30, S31 constitute a control means.

As having been mentioned above, according to the above embodiment, there is constituted such that the moving motion pitch is calculated on the basis of the detection signal from the sensors 11, 12 that the switching circuit 13 has selected, the moving motion pitch is calculated by performing the processing having been selected from among plural kinds of processings, which have been stored in the memory 18, on the basis of the detection signal from the sensors 11, 12 that the switching circuit 13 has selected, the moving motion pitch is calculated by selecting the other processing among the plural kinds of processings when both the moving motion pitches differ, and the step number measurement is performed by the selected processing when both the moving motion pitches become the same.

Accordingly, without using the detecting sections of plural systems, the constitution is simple and the reduction in electric power becomes possible.

Further, without providing the restriction in the moving motion, it is possible to correspond to the plural moving motions.

Further, without using the sensors of many axes, only by adding the sensor by one to the step number measuring apparatus of a single sensor system, it becomes possible to correspond to the plural moving motions (the walking, the excise walking and the running).

Further, by using the two kinds of sensors for walking and running and the two kinds of algorithms, it becomes possible to correspond to the three kinds of moving motions.

According to the invention, there is brought about an advantage that the reduction in electric power becomes possible by the simple constitution without providing the detecting sections of plural systems, and it becomes possible to correspond to the plural movements.

There can be applied to the step number measurement in the various moving motions such as walking and running.

What is claimed is:

1. A step number measuring apparatus comprising:
   plural sensors which detect a moving motion and output a corresponding detection signal and whose sensitivity axes mutually differ;
   sensor selecting means for selecting any one of the sensors;
   amplifying means for amplifying and outputting the detection signal from the sensor selected by the sensor selecting means;
   first calculation means for calculating a moving motion pitch on the basis of the amplified detection signal from the sensor selected by the sensor selecting means;
   second calculation means for calculating a moving motion pitch by performing a selected processing on the basis of the amplified detection signal from the sensor selected by the sensor selecting means;
   control means for selecting any one processing from among plural kinds of processings, selecting another processing from among the plural kinds of processings when the moving motion pitch calculated by the first calculation means differs from the moving motion pitch calculated by the second calculation means, and altering a gain of the amplifying means to a gain complying with the selected processing; and step number measuring means for performing a step number measurement by the processing selected by the control means.

2. A step number measuring apparatus according to claim 1; wherein when a predetermined detection signal is not outputted from the sensor selected by the sensor selecting means, the control means controls the sensor selecting means so as to select the other sensor.

3. A step number measuring apparatus according to claim 1; wherein a sensor for walking, which has a sensitivity axis suitable for a walking detection, and a sensor for running, which has a sensitivity axis suitable for a running detection, are included in the plural sensors, and a processing for walking and a processing for running are included in the plural processings, the control means selects the sensor for walking and the processing for walking when performing the step number measurement at a walking time, selects the sensor for running and the processing for walking when performing the step number measurement at an excise walking time, and selects the sensor for running and the processing for running when performing the step number measurement at a running time, and the step number measuring means performs the step number measurement by using the sensor and the processing, that the control means has selected.

4. A step number measuring apparatus according to claim 1; wherein when the control means has judged that, under a state in which the processing is set to the processing for running, the moving motion pitch calculated by the second calculation means is not a pitch corresponding to the running, it switches the processing to the processing for walking.

5. A step number measuring apparatus according to claim 1; wherein when the control means has judged that, under a state in which the processing is set to the processing for walking, the moving motion pitches calculated by the first calculation means and the second calculation mutually differ, it switches the processing to the processing for running.

* * * * *